July 13, 1943.  K. E. BAKER  2,324,351
PLATE FOR CONTROLLING TEMPERATURE OF FOOD AND SERVING SAME
Filed Nov. 25, 1938

Inventor
KENNETH E. BAKER
By Semmes Keegin + Semmes
Attorneys.

Patented July 13, 1943

2,324,351

UNITED STATES PATENT OFFICE 2,324,351

PLATE FOR CONTROLLING TEMPERATURE OF FOOD AND SERVING SAME

Kenneth E. Baker, Fremont, Mich., assignor to Gerber Products Company, Fremont, Mich.

Application November 25, 1938, Serial No. 242,409

2 Claims. (Cl. 65—15)

My invention relates to a plate for controlling the temperature of food, and for serving the same. Though it is particularly adapted for keeping food warm, it may be used for maintaining a lower temperature of the food being served.

Heretofore dishes for serving food which had in connection with them means for maintaining the desired temperature of the serving dish were in general unsanitary. Particularly where children employ serving plates the edges of the plate heretofore have been found to be unsanitary. The child will drag his food across the edge of the plate and the metallic container which holds the warming or cooling fluid is apt to be brought in contact with the food.

Particularly was this the case at the top edge of the metallic container which was in general located at the level, or above the level, of the upper surface of the pottery body.

In my form of invention I have the upper edge of the metallic container located below the upper surface of the pottery body, thus getting it out of the way of the food of the user. This sanitary feature is of great importance in serving food to children. Moreover, I have devised a pottery body whose upper surface is level. The filling aperture lies on a level with the upper level surface of the pottery body, thus insuring sanitation and a minimum collection of dirt.

My warming and serving plate comprises a pottery body having an annular upper surface, provided with a side wall. The side wall of the body has a ridge thereon. Adapted to fit on the side wall is the upper rim of a metallic fluid container. The upper rim of the metallic fluid container is bent around the annular ridge on the side wall of the body and crimped into place. A filling aperture is provided flush with the upper annular surface of the pottery body, and a suitable closure means is provided for the filling opening. Handles are provided at either side of the construction, and in my preferred form the plate is divided into compartments for containing different types of food.

An object of the invention is to provide a construction which is strong and sturdy, and in which the strains incident to use will not cause damage to the pottery body.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

Figure 1:
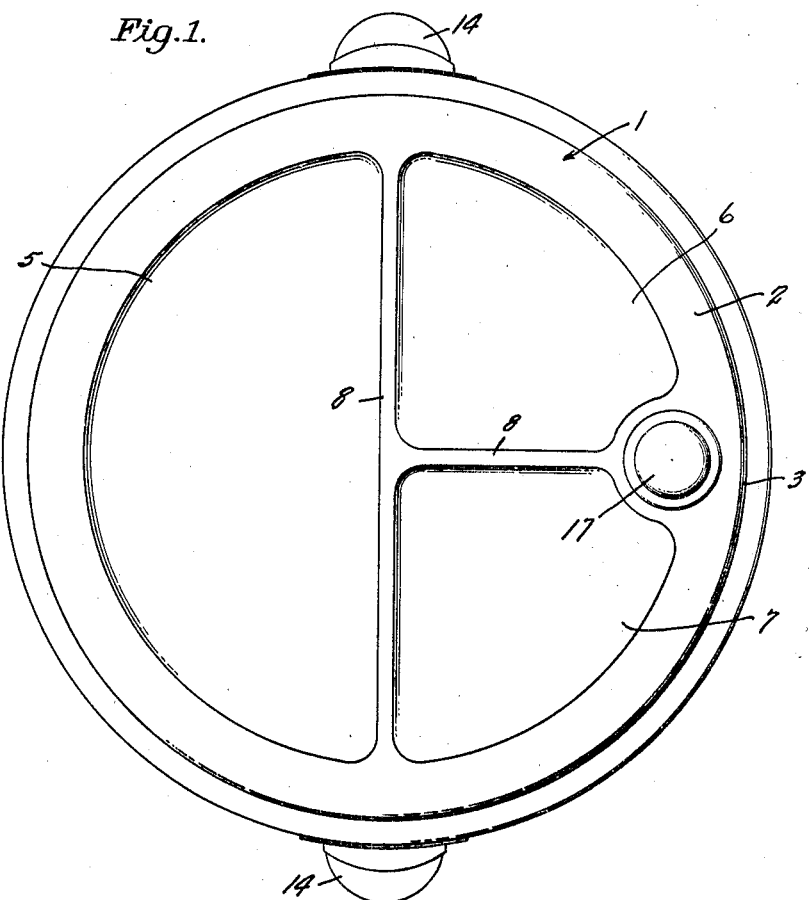
Figure 1 is a top plan view of my construction.

Referring to the drawing, I have shown a pottery body 1 which comprises an annular upper surface 2. The annular upper surface 2 has a rounded edge, as indicated at 3, and below the edge is formed an annular ridge 4. The plate proper is provided with apertures 5, 6 and 7, which are separated by means of partition walls 8. The partition walls 8 form compartments for containing different types of food.

Adapted to lie below the pottery body 1 is a metallic fluid container 9. The metallic fluid container 9 is adapted to have its wall at 10 just below the lower edge 11 of a side wall 12 of the potter body 1.

Figure 2:
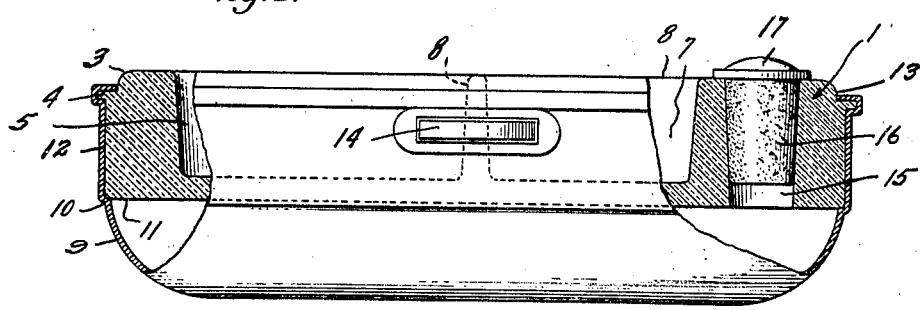
Fig. 2 is a view in side elevation of my construction, parts being broken away to more clearly indicate the details.

This construction, where the fluid container 9 is adapted to have its wall inset slightly from the side wall 12 of the pottery body provides a strong construction which relieves the strain on the annular ridge 4, which is formed on the side wall of the pottery body. The upper portion of the metallic fluid container 9 is adapted to lie snugly against the side wall 12 and to be crimped over the annular ridge 4, as indicated in Figure 2.

It is to be noted, as I have indicated at 13, that the upper edge of the metallic fluid container lies well below the annular upper surface 2 of the pottery body. This is a sanitary feature of considerable importance, particularly where children are using my warming plate.

Handles 14 are provided on the metallic fluid container. A filling aperture 15 is provided, whose upper end lies flush with the annular upper surface 2 of the pottery body 1. A cork, or other suitable closure means, 16 is adapted to fit in the aperture 15. The cork may be provided with a sanitary cap 17.

The construction is strong and sturdy. By reason of the inset in the metallic fluid container at 10, the strain of supporting the pottery body 1 is taken at this point rather than being thrown entirely on the annular ridge 4.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A dish for maintaining food at a desired temperature comprising, a pottery body having a vertical side wall and a base, said side wall having an annular upper surface, a metallic fluid container attached to the outer side of the side wall of the body, said pottery body and metallic fluid container forming a fluid retaining cavity, an annular ridge on the side wall, the upper edge of said metallic fluid container being crimped over the ridge on the side wall to maintain the pottery body and fluid container in assembled position, said annular ridge being disposed on the side wall below the upper surface and the said edge of the fluid container extending over the ridge and abutting in a close fit against the side wall intermediate the ridge and the upper surface to form a sanitary juncture therewith out of normal contact with food during use, said annular upper surface of the body having a filling opening therethrough flush with the upper surface thereof, and closure means for the filling opening.

2. A dish for maintaining food at a desired temperature comprising a body of pottery or like material having an annular upper surface, a side wall and a base, a metallic fluid container attached to the pottery body to form a fluid retaining cavity, an annular ridge on the outside of the pottery body below the upper surface, the upper edge of said metallic fluid container being crimped over the annular ridge so that it lies below the upper surface and forms a tight fit with the pottery body out of normal contact with food during use and serving to maintain the container and pottery body in assembled position, said annular upper surface of the body having a filling opening therethrough adapted to be closed in use.

KENNETH E. BAKER.